Sept. 29, 1970    H. F. DATES    3,531,313
RADIATION-REFLECTING MEDIUM
Filed May 19, 1967
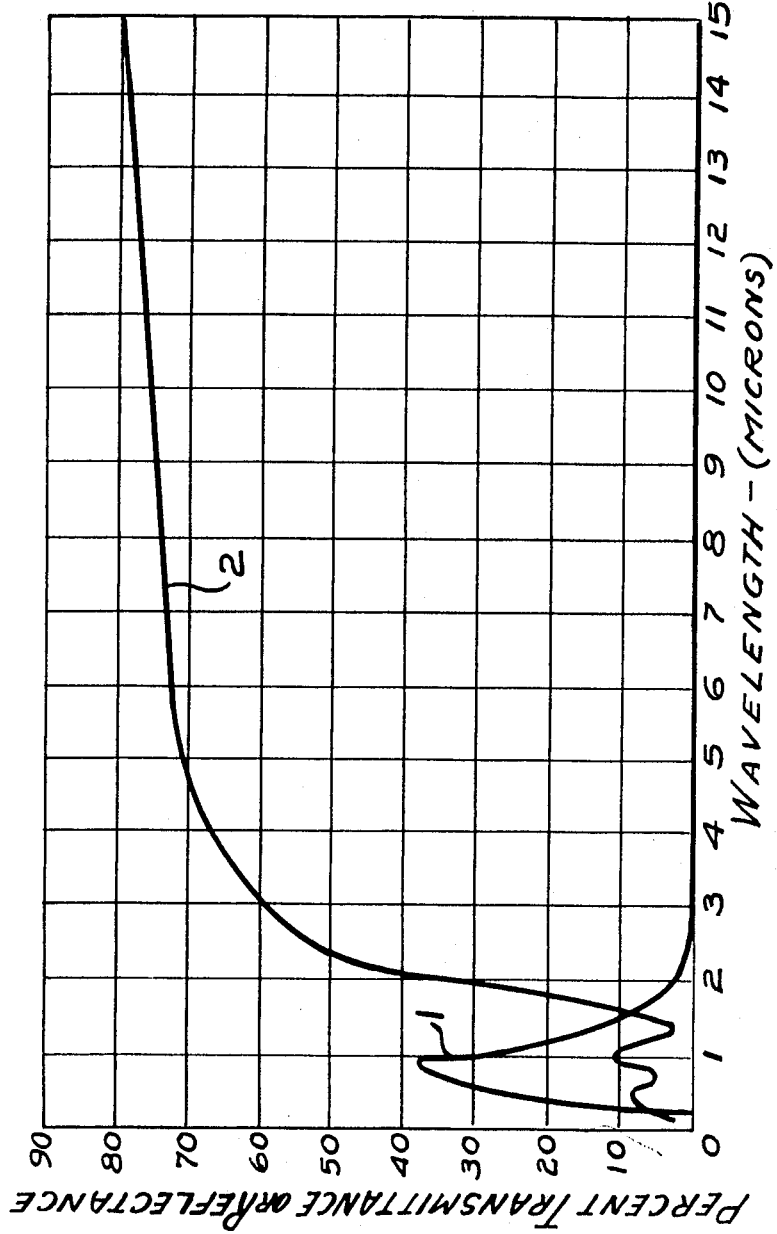
Fig.1
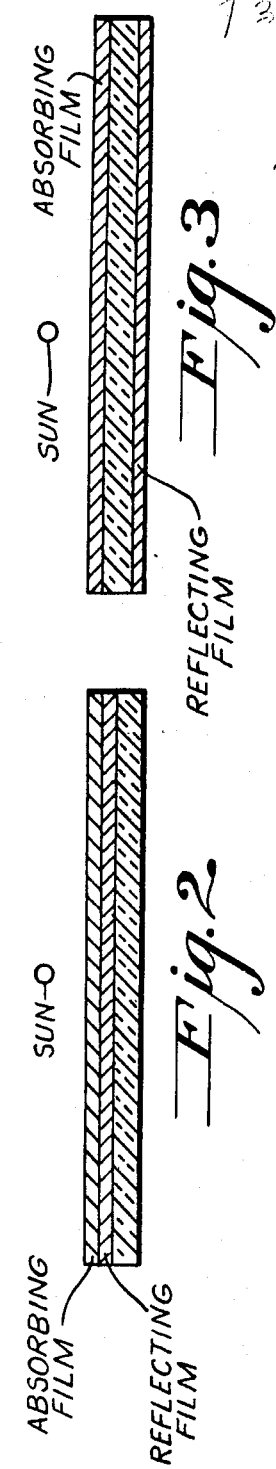
Fig.2
Fig.3
INVENTOR.
HAROLD F. DATES
BY Clarence R. Patty, Jr.
ATTORNEY United States Patent Office 3,531,313
Patented Sept. 29, 1970

1

3,531,313
RADIATION-REFLECTING MEDIUM
Harold F. Dates, Corning, N.Y., assignor to Corning Glass Works, Corning, N.Y., a corporation of New York
Continuation-in-part of application Ser. No. 404,557, Oct. 8, 1964, which is a continuation of application Ser. No. 156,385, Dec. 1, 1961. This application May 19, 1967, Ser. No. 643,013
Int. Cl. C03c 17/06; C02b 1/10
U.S. Cl. 117—33.3                    7 Claims

ABSTRACT OF THE DISCLOSURE

A window which has the ability to transmit substantial amounts of solar light energy while reflecting a substantial portion of the heat energy contained in solar radiation. The window is formed of a sheet of glass having thereon two films, each film comprising a mixture of the oxides of tin and antimony.

CROSS REFERENCES TO RELATED APPLICATIONS

This application is a continuation-in-part of my copending application, Ser. No. 404,557, filed Oct. 8, 1964, now abandoned, which is, in turn, a continuation of my application, Ser. No. 156,385, filed Dec. 1, 1961, now abandoned.

BACKGROUND OF THE INVENTION

Radiation-reflecting films are well known, and specific compositions comprising certain iridized metallic oxide films are disclosed, for example, in U.S. Pat. 2,564,708, issued to J. M. Mochel. Such coatings have limited utility, however, in that their reflective efficacy for solar shielding purposes is substantially limited to wavelengths in the far infrared portion of the spectrum, which portion contains only a negligible part of the energy emitted by the sun.

It has been discovered, by persons other than the present inventor, that such metallic oxide films may be used advantageously in combination with other media having the ability to absorb energy in the visible and near infrared portions of the spectrum and subsequently to reemit the same energy at wavelengths within the range reflected by such films. This discovery is disclosed in detail in a copending application, Ser. No. 565,032, filed June 24, 1966.

Although the combinations disclosed in the cited application exhibit satisfactory heat-shielding qualities, such compositions have generally been aesthetically unsatisfactory in that the apparent colors of objects viewed therethrough have been distorted. Although such distortion can be tolerated in certain industrial applications, it is highly desirable that it be eliminated in applications where human comfort is a factor, such as homes and office buildings, and in other applications where it is necessary that objects be seen in their natural colors.

Accordingly, it is an object of this invention to provide a window which is an efficient radiation-reflecting medium and which at the same time permits objects viewed therethrough to be seen in their natural colors.

It is a further object to provide a heat-reflecting window which reflects also a substantial amount of radiation throughout the visible portions of the spectrum so as to prevent glare while at the same time permitting objects to be viewed therethrough without distortion of color.

SUMMARY OF THE INVENTION

The objects of the invention are accomplished by the provision of a radiation-shielding window comprising a transparent material having thereon two films, each film comprising a mixture of the oxides of tin and antimony, the film located nearer the source of radiation being an absorbing film, and the film located farther from the source of radiation being a reflecting film. The absorbing film comprises a combination of approximately 59.8–96.5% by weight of an oxide of antimony computed as $Sb_2O_3$ and approximately 3.5–40.2% by weight of an oxide of tin computed as $SnO_2$. The reflecting film comprises a combination of at least 0.7% but less than 1.5% by weight of an oxide of antimony computed as $Sb_2O_3$ and an amount of an oxide of tin computed in $SnO_2$ which is greater than 98.5%, but not greater than 99.3%.

BRIEF DESCRIPTION OF THE DRAWING

FIG. 1 is a graph illustrating, in curves 1 and 2, respectively, the approximate percentages of radiation transmitted and reflected at various wavelengths by a film combination utilized in the preferred embodiment of the invention, FIG. 2 is a sectional view of a sheet of glass having thereon a combination of films according to the present invention, and FIG. 3 is a view similar to FIG. 2, illustrating another film arrangement.

DESCRIPTION OF THE PREFERRED EMBODIMENT

The energy-reflecting medium of the present invention comprises two films. These films are formed by conventional and well-known methods, which generally comprise contacting a heated glass surface with a vapor or an atomized solution of one or more thermally decomposable metal salts of metallo-organic compounds which decompose to produce corresponding metallic oxide films on the heated surface. For a more detailed description, reference is made to previously-mentioned U.S. Pat. 2,564,708.

The films of this invention are produced by application to a hot glass surface of solutions comprising as their film forming solutes varying percentages of $SnCl_4 \cdot 5H_2O$ and $SbCl_3$. The solutes decompose to form oxides of the respective metals. For the present purposes the composition of the various films comprising the oxide combinations will be defined as computed in the conventional manner on the respective bases of $SnO_2$ and $Sb_2O_3$.

It has been found that the most satisfactory reflecting medium can be produced when the absorbing coating is deposited from a solute comprising $SnCl_4 \cdot 5H_2O$ and $SbCl_3$ in the ratio 15:85 by weight, and the reflecting coating is deposited from a solute comprising these components in the ratio 99.2:0.8 by weight. Computed as $SnO_2$ and $Sb_2O_3$ in the film, the respective ratios become 10.5:89.5 and 98.8:1.2.

FIG. 1 presents transmittance and reflectance data, in curves 1 and 2 respectively, for such a combination in which the absorbing and reflecting coatings have thicknesses described respectively as fourth order red and third order red. The films are deposited on the same side of a sheet of borosilicate glass having a composition approximately 80% $SiO_2$, 14% $B_2O_3$, 4% $Na_2O$ and 2% $Al_2O_3$ by weight and a thickness of ¼ inch. The reflecting film is deposited on top of the absorbing film, and the radiation source is placed on the side of the glass away from the films.

It can be seen from the graph that the combination has the ability to reflect heat radiations in amounts up to 80% of that of a given wavelength falling upon the glass surface while reflecting less than 10% of the visible radiations falling thereon. Transmittance of visible radiation varies within the range approximately 20–35% while no heat radiations longer than about 2.5 microns are transmitted.

The figures do not represent precisely the transmittance and reflectance characteristics of the combination under operating conditions. It would be expected that under such conditions the sum of the total energy transmitted and reflected would approximate 100% of that falling upon the medium. This figure is not approached in the curves of FIG. 1, since the data was taken from a window which had not been heated to its operating temperature, and hence the disparity represents absorbed radiation. In actual operation this energy would be partly conducted away and partly reemitted as heat radiations mostly in the far infrared portion of the spectrum. However, the reflecting coating, which is always located farther from the source of radiation than the absorbing coating, as illustrated in FIGS. 2 and 3, would in turn reflect those radiations falling thereon, and consequently the transmittance values of curve 1 are close approximations to the transmittance characteristics of the medium under conditions of actual use. Under conditions of actual use the described combination of films transmits approximately 25% of the energy falling thereon, thus giving substantial glare reduction while permitting objects viewed therethrough to be seen in their natural colors.

The absorbing coating of the invention may be varied through a wide range of compositions. Transmittance of luminous energy increases with increased concentration of antimony. When the absorbing coating solute contains 95% $SbCl_3$ (96.5% computed as $Sb_2O_3$ in the film) and 5% $SnCl_4·5H_2O$ (3.5% computed as $SnO_2$ in the film) and the above-reflecting film is utilized, a luminous transmittance of about 55% results. When the solute from which the absorbing coating is formed contains equal amounts of $SbCl_3$ and $SnCl_4·5H_2O$ (59.8% and 40.2% computed as $Sb_2O_3$ and $SnO_2$, respectively, in the film), luminous transmittance is approximately 30%. All absorbing films within this range permit objects to be viewed in their natural colors—the glass itself being gray in appearance. As the amount of $SbCl_3$ is decreased below 50% in the solute, objects viewed by transmitted light begin to take on a purple tint. Accordingly, it has been found advantageous to limit the composition of the absorbing coating within the above range.

The solute from which the reflecting coating is formed may contain $SbCl_3$ in any amount less than 1% (less than 1.5% computed as $Sb_2O_3$ in the film), as long as the solute contains at least 0.5% $SbCl_3$ (at least 0.7% computed as $Sb_2O_3$ in the film). $SnCl_4·5H_2O$ may be present in the solute from which the reflecting coating is formed in any amount greater than 99% (greater than 98.5% computed as $SnO_2$ in the film) but not greater than 99.5% (not greater than 99.3% computed as $SnO_2$ in the film).

Variations in film thickness do not affect the color of objects viewed through the films. The effect of increasing film thicknesses is to decrease the transmission of both visible and heat radiations. In general, the films may have thicknesses up to a maximum of about 8,000 angstrom units.

The films of this invention may be placed both on the same side of the glass or on opposite sides, as illustrated respectively in FIGS. 2 and 3. The only requirement is that the absorbing film be the one nearer the source of radiation.

I claim:
1. A solar radiation-shielding viewing closure for a structure occupied by humans which has a substantially uniform transmission across the visible portion of the radiation spectrum, comprising a substantially transparent glass sheet, a metal oxide film that absorbs solar radiation and emits the absorbed energy in the form of radiation of a longer wave length, and a second metal oxide film that reflects said longer wave length radiation, the absorbing film being composed of 59.8–96.5% by weight of an oxide of antimony computed as $Sb_2O_3$ and the balance an oxide of tin, the reflecting film being composed of at least 0.7%, but less than 1.5%, by weight of an oxide of antimony computed as $Sb_2O_3$ and the balance being an oxide of tin, and wherein the metal oxide films of the viewing closure assembly are so arranged, in relation to one another, that, when the closure is mounted in the structure, the absorbing metal oxide film is nearer the solar radiation and the reflecting film is farther away from such radiation, the metal oxide films being on the same side of the glass sheet and the reflecting film being superimposed on the absorbing film.

2. A structural closure member according to claim 1 in which the reflecting film comprises a combination of approximately 1.2% by weight of an oxide of antimony computed as $Sb_2O_3$ and approximately 98.8% by weight of an oxide of tin computed as $SnO_2$.

3. A structural closure member according ot claim 1, in which the absorbing film comprises a combination of approximately 89.5% by weight of an oxide of antimony computed as $Sb_2O_3$ and approximately 10.5% by weight of an oxide of tin computed as $SnO_2$.

4. A structural closure member according to claim 1, in which the reflecting film comprises a combination of approximately 1.2% by weight of an oxide of antimony computed as $Sb_2O_3$ and approximately 98.8% by weight of an oxide of tin computed as $SnO_2$ and the absorbing film comprises a combination of approximately 89.5% by weight of an oxide of antimony computed as $Sb_2O_3$ and approximately 10.5% by weight of an oxide of tin computed as $SnO_2$.

5. A structural closure member according to claim 1, in which the absorbing film comprises a combination of approximately 89.5% by weight of an oxide of antimony computed as $Sb_2O_3$ and approximately 10.5% by weight of an oxide of tin computed as $SnO_2$.

6. A structural closure member according to claim 1, in which the reflecting film comprises a combination of approximately 1.2% by weight of an oxide of antimony computed as $Sb_2O_3$ and approximately 98.8% by weight of an oxide of tin computed as $SnO_2$, and the absorbing film comprises a combination of approximately 89.5% by weight of an oxide of antimony computed as $Sb_2O_3$ and approximately 10.5% by weight of an oxide of tin computed as $SnO_2$.

7. A solar radiation-shielding viewing closure for a structure occupied by humans which has a substantially uniform transmission across the visible portion of the radiation spectrum, comprising substantially transparent glass sheet, a metal oxide film that absorbs solar radiation and emits the absorbed energy in the form of radiation of a longer wave length, and a second metal oxide film that reflects said longer wave length radiation, the absorbing film being composed of 59.8–96.5% by weight of an oxide of antimony computed as $Sb_2O_3$ and the balance an oxide of tin, the reflecting film being composed of at least 0.7%, but less than 1.5%, by weight of an oxide of antimony computed as $Sb_2O_3$ and the balance being an oxide of tin, and wherein the metal oxide films of the viewing closure assembly are so arranged, in relation to one another, that, when the closure is mounted in the structure, the absorbing metal oxide film is nearer the solar radiation and the reflecting film is farther away from such radiation, the reflecting film being on the inside of the glass sheet and the absorbing film being on the outside of the glass sheet.

References Cited

UNITED STATES PATENTS 2,564,677  8/1951  Davis  117—69

FOREIGN PATENTS 466,325  7/1950  Canada.

WILLIAM D. MARTIN, Primary Examiner

R. M. SPEER, Assistant Examiner

U.S. Cl. X.R.

117—68, 69, 124